United States Patent
Clark et al.

(10) Patent No.: US 12,195,646 B2
(45) Date of Patent: Jan. 14, 2025

(54) POLYURETHANE ADHESIVE FOR BONDING CROSSLINKED RUBBER

(71) Applicant: DDP SPECIALTY ELECTRONIC MATERIALS US, LLC, Wilmington, DE (US)

(72) Inventors: Thomas Clark, Auburn Hills, MI (US); Roger Cassell, West Alexandria, OH (US); Daniel Sophiea, Auburn Hills, MI (US); Sarah Mastroianni, Midland, MI (US); Aaron Antwi, Auburn Hills, MI (US); Huide Zhu, Auburn Hills, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 253 days.

(21) Appl. No.: 17/791,304

(22) PCT Filed: Jan. 25, 2021

(86) PCT No.: PCT/US2021/014892
§ 371 (c)(1),
(2) Date: Jul. 7, 2022

(87) PCT Pub. No.: WO2021/167751
PCT Pub. Date: Aug. 26, 2021

(65) Prior Publication Data
US 2023/0348766 A1    Nov. 2, 2023

Related U.S. Application Data

(60) Provisional application No. 62/977,789, filed on Feb. 18, 2020.

(51) Int. Cl.
*C09J 175/12* (2006.01)

(52) U.S. Cl.
CPC ....... *C09J 175/12* (2013.01); *C09J 2301/312* (2020.08); *C09J 2421/006* (2013.01)

(58) Field of Classification Search
None
See application file for complete search history.

(56) References Cited

U.S. PATENT DOCUMENTS

| | | | |
|---|---|---|---|
| 3,194,793 A * | 7/1965 | Kogon | C08G 18/48 528/68 |
| 5,002,806 A | 3/1991 | Chung | |
| 2010/0108260 A1 | 5/2010 | Rasche et al. | |
| 2012/0295104 A1 | 11/2012 | Barker | |

FOREIGN PATENT DOCUMENTS

CA    2021308 A1 *    2/1991

* cited by examiner

*Primary Examiner* — Michael N Orlando
*Assistant Examiner* — Abhishek A Patwardhan

(57) ABSTRACT

Disclosed herein are two-component polyurethane adhesive systems comprising a mixture of primary and secondary diamines.

10 Claims, No Drawings

POLYURETHANE ADHESIVE FOR BONDING CROSSLINKED RUBBER

FIELD OF DISCLOSURE

The disclosure relates to polyurethane based two-component adhesives.

BACKGROUND

Polyurethane adhesives offer good adhesion to a variety of substrates, including crosslinked elastomeric material. However, polyurethanes undergo considerable weakening at higher temperatures. Vulcanized elastomers can be exposed to temperatures exceeding 100° C. in many applications, often under high loads. To achieve higher strength (defined as tear strength and high elastomeric modulus), chain extenders are often added to provide a high-$T_g$ hard segment within the polyurethanes. Typical chain extenders include low molecular weight diol, diamine, aminoalcohol, and water. However, there is still need to developed polyurethane adhesives with improved peel strength at higher temperatures, e.g., 82° C. or higher temperature.

SUMMARY

Provided herein are two-component polyurethane adhesive systems comprising Part A and Part B, wherein, Part A comprises (i) at least a first polyol, (ii) a primary diamine, and (iii) a secondary diamine; and Part B comprises a prepolymer that is a reaction product of at least one polyisocyanate and at least a second polyol, and wherein, the content level of the primary diamine is about 7-19 wt %, based on the total weight of Part A; the combined content level of the primary diamine and the secondary diamine is about 10-30 wt %, based on the total weight of the two-component polyurethane adhesive system.

In one embodiment of the two-component polyurethane adhesive system, Part A and Part B are at a weight ratio of about 1:5-5:1.

In a further embodiment of the two-component polyurethane adhesive system, Part A comprises about 15-23 wt % of the secondary diamine, based on the weight of Part A.

In a yet further embodiment of the two-component polyurethane adhesive system, the primary diamine is selected from the group consisting of dimethylthiotoulenediamine (DMTDA), methylenedianiline, diethyltoluenediamine, phenylenediamine (1,4-diaminobenzene), 4,4'-diaminobiphenyl, diaminonaphthalene, and combinations of two or more thereof.

In a yet further embodiment of the two-component polyurethane adhesive system, the secondary diamine is selected from the group consisting of N,N'-di-sec-butyl-p-phenylenediamine (DSB-PDA); 4,4'-methylenebis[N-sec-butylaniline] (DSB-MDA); primary aromatic diamines that have been N-alkylated; and combinations of two or more thereof.

In a yet further embodiment of the two-component polyurethane adhesive system, the first polyol has a functionality of about 2-7 and an average equivalent weight of about 50-8000 g/mol.

Further provided herein are articles comprising a first substrate, a second substrate, and a two-component polyurethane adhesive system as provided above, wherein, the two-component polyurethane adhesive system is placed in-between the first and second substrates.

In one embodiment of the article, one or both of the first and second substrates are formed of cross-linked elastomers.

DETAILED DESCRIPTION

Provided herein are two-component polyurethane adhesive systems formed of two parts, Part A and Part B. Part A, as disclosed herein, comprises at least one polyol and a mixture of primary diamine and secondary diamines, while, Part B comprises a prepolymer that is a reaction product of at least one polyisocyanate and at least one polyol. Moreover, in accordance with the present disclosure, Part A comprises about 7-19 wt % of the primary amine, based on the total weight of Part A, and the adhesive system comprises about 10-30 wt % of the mixture of the primary and secondary diamines, based on the total weight of the two-component polyurethane adhesive system.

The polyols used herein include, without limitation, polyether polyols, polyester polyols, poly(alkylene carbonate)polyols, polybutadiene polyols, hydroxyl containing polythioethers and mixtures thereof. In one embodiment, the polyols used herein are polyether polyols containing one or more alkylene oxide units in the backbone of the polyol. Exemplary alkylene oxide units include ethylene oxide, propylene oxide, butylene oxide, and mixtures thereof. The alkylene oxides may contain straight or branched chain alkylene units. In the embodiments where a mixture of alkylene oxide units are contained in a polyol, the different units can be randomly arranged or can be arranged in blocks of each of the alkylene oxides. In certain embodiments, the polyols used herein may be diols, triols, or mixtures of diols and triols.

In accordance with the present disclosure, the polyols comprised in Part A may have a functionality of about 2-7, or about 2-5, or about 2-3 and an average equivalent weight of about 50-8000 g/mol, or about 50-4000 g/mol, or about 80-2000 g/mol. Based on the weight of Part A, about 35-65 wt % or about 40-60 wt % of the polyol may be comprised in Part A.

Also comprised in Part A are mixtures of primary and secondary diamines. Preferably, the primary and secondary diamines used herein are aromatic diamines. Suitable primary diamines used herein include, without limitation, dimethylthiotoulenediamine (DMTDA), methylenedianiline, diethyltoluenediamine, phenylenediamine (1,4-diaminobenzene), 4,4'-diaminobiphenyl, diaminonaphthalene, etc., while suitable secondary diamines used herein include, without limitation, N,N'-di-sec-butyl-p-phenylenediamine (DSB-PDA); 4,4'-methylenebis[N-sec-butylaniline] (DSB-MDA); any primary aromatic diamines described above that have been N-alkylated (methylated, ethylated, sec-butylated), etc. Based on the weight of Part A, about 7-19 wt % of the primary diamine and about 15-23 wt % of the secondary diamine is comprised in Part A, provided that the combined content level of the primary and secondary diamines ranges from about 10-30 wt %, based on the total weight of the 2-component polyurethane adhesive system.

In accordance with the present disclosure, the polyisocyanates used in forming the prepolymer of Part B are multifunctional isocyanates (e.g., diisocyanates and triisocyanates) and may be aliphatic, alicyclic, or aromatic polyisocyanates. Exemplary polyisocyanates used herein include, without limitation, ethylene diisocyanate; hexamethylene-1,6-diisocyanate (HDI); isophorone diisocyanate (IPDI); 4,4'-, 2,2'- and 2,4'-dicyclohexylmethane diisocyanate (H12MDI); norbornene diisocyanate; 1,3- and 1,4-(bisisocyanatomethyl)cyclohexane (including cis- or trans-isomers thereof);

tetramethylene-1,4-diisocyanate (TMXDI); 1,12-dodecane diisocyanate; 2,2,4-trimethylhexamethylene diisocyanate; 2,2'-, 2,4'- and 4,4'-methyldiphenyl diisocyanate (MDI); carbodiimide modified MDI; 2,4- and 2,6-toluene diisocyanate (TDI); 1,3- and 1,4-phenylene diisocyanate; 1,5-naphthylene diisocyanate; triphenylmethane-4,4',4"-triisocyanate; polyphenylpolymethylene polyisocyanates; and polymeric compounds thereof. In one embodiment, the polyisocyanates used herein are oligomeric or polymeric isocyanates with aromatic groups. In a further embodiment, the polyisocyanates used herein are selected from 2,2'-, 2,4'- and 4,4'-methyldiphenyl diisocyanate (MDI); carbodiimide modified MDI; 2,4- and 2,6-toluene diisocyanate (TDI); 1,3- and 1,4-phenylene diisocyanate; 1,5-naphthylene diisocyanate; triphenylmethane-4,4',4"-triisocyanate; polyphenylpolymethylene polyisocyanates; and polymeric compounds thereof. In a yet further embodiment, the multifunctional isocyanate used herein is MDI or polymeric MDI.

The polyisocyanates used in Part B may have a percent NCO amount of up to about 75%, or up to about 50%, or up to about 35%. For example, the percent NCO amount may range from about 20-75%, or from about 28-34%. In certain embodiments, the polyisocyanates used herein may have an average isocyanate functionality of at least about 2, or at least about 2.2, or at least about 2.4; and no greater than about 4, or no greater than about 3.5, or no greater than about 3.2. In a further embodiment, the equivalent weight of the polyisocyanate may be at least about 100, or at least about 110, or at least about 120; and may be no greater than about 300, or no greater than about 250, or no greater than about 200.

The polyol used in forming the prepolymer comprised in Part B may be any suitable polyol as described above. In one embodiment, the polyol used in Part B is a polyether diol. The prepolymer can be formed by methods known to those skilled in the art, by an application of heat, by the addition of catalysts, or a combination of both. The prepolymer may have a viscosity of less than about 20,000 cPs at room temperature, or less than about 10,000 cPs at room temperature, or less than about 8000 cPs at room temperature. The molecular weight of the polyol, the functionality of the polyol and the wt % polyol in the prepolymer are chosen to generate a prepolymer with an isocyanate content of between about 2-27 wt %, or between about 5-20 wt %, or between about 10-20 wt %

Moreover, carbon black may be incorporated in the composition of Part A, Part B, or both. In one embodiment, about 6-15 wt % of carbon black is incorporated in the two-component adhesive system.

Further, additional additives also may be added in the composition of Part A, Part B, or both. These include, without limitation, catalysts, plasticizers, crosslinkers, fillers, moisture scavengers, colorants, thermal stabilizers, etc. In particular, a number of aliphatic and aromatic amines (e.g., diaminobicyclooctane-DABCO), organometallic compounds (e.g., dibutyltin dilaurate, dibutyltin diacetate), alkali metal salts of carboxylic acids and phenols (calcium, magnesium, strontium, barium, salts of hexanoic, octanoic, naphthenic, linolenic acid) may be used as catalysts.

In accordance with the present disclosure, the compositions of Part A and Part B are prepared and stored separately until use. Prior to application, the composition of Part A and Part B are mixed at a weight ratio of about 1:5-5:1, or about 1:4-4:1, or about 1:2-2:1.

As demonstrated by the examples below, by adding a mixture of primary and secondary diamines in Part A, the resulting two-component adhesive systems exhibit much more improved peel strength to cross-linked elastomeric material.

Further provided herein are methods for applying the two-component adhesive system in between two substrates to form a bonded structure. In one embodiment, one or both of the two substrates are formed of cross-linked elastomers, e.g., vulcanized rubber. Typically, Part A and Part B are mixed before the adhesive system is applied in between the substrates, followed by curing at ambient temperature.

EXAMPLES

Materials
Polyol-1—a capped polyether triol (functionality: 3; MW: 4610 g/mol) obtained from Dow Inc. under the trade name VORANOL™ 232-036N;
Polyol-2—a polyether triol (functionality: 3; MW: 254 g/mol) obtained from Dow Inc. under the trade name VORANOL™ 230-660;
Polyol-3—a liquid hydroxyl terminated polymer of butadiene (functionality of 2.5, MW: 1300 g/mol) obtained from Cray Valley USA, LLC under the trade name Poly bd™ R-20LM;
Polyol-4—propylene glycol based polyether polyol diol (functionality: 2; MW: 2000 g/mol) obtained from Dow Inc. under the trade name VORANOL™ 220-056N;
DMTDA—primary diamine dimethylthiotoulenediamine (DMTDA) obtained from Albemarle under the trade name ETHACURE™ 300 Curative;
DSB-PDA—secondary diamine N,N'-di-sec-butyl-p-phenylenediamine (DSB-PDA) obtained from Dorf Ketal, LLC under the trade name UNILINK™ 4100;
DSB-MDA—secondary diamine 4,4'-methylenebis[N-sec-butylaniline] (DSB-MDA) obtained from Dorf Ketal, LLC under the trade name UNILINK™ 4200;
P-MDI—polymeric MDI (polymethylene polyphenylisocyanate that contains MDI) obtained from Dow Inc. under the trade name PAPI™ 27;
CB—carbon black obtained from Cabot under the trade name ELFTEX™ S7100;
Defoamer—obtained from Dystar under the trade name FOAM BLAST™ 20F.

Part A:
For Part A of each example, the components listed in Table 1 were combined in a speed mixer and loaded into cartridges.

Part B:
In each of the examples, Part B was prepared as follows. First, the following components were mixed at 47° C.: P-MDI (1996 g); Polyol-4 (1366 g); Defoamer (0.26 g); and dimethyltin carboxylate (14.64 g of a 2.43 wt % solution in diisononyl phthalate). Then, diisononyl phthalate (90.6 g); diethyl malonate (35 g); and 4,4'-(di-2,1-ethanediyl)bismorpholine (DMDEE, 2.64 g) were added into the mixture and mixed at 60° C. After cooling the mixture to room temperature, CB (dried overnight in an oven at about 200-204° C.) was added at 10 wt % into the mixture and the resulting dispersion was mixed using a Flaktek speed mixer.

Peel Strength:
Vulcanized rubber strips (a blend of polybutadiene (BR) and styrene-butadiene (SBR)) were roughened on a belt sander and the surfaces were activated by the use of a chemical oxidant, in these examples a 2 wt % solution of trichloroisocyanuric acid in ethyl acetate. After allowing the solution to dry for at least 5 minutes, the coupon surface was wiped with organic solvent, in this example toluene. In each example, Part A and Part B were mixed at a weight ratio, as listed in Table 1, with a Flaktek speed mixer and applied between two pieces of 2-inch wide vulcanized rubber strips (a blend of polybutadiene (BR) and styrene-butadiene (SBR)), and the test assembly was placed in a vacuum with active vacuum applied for 2-4 hours. Then, the test assemblies were removed from vacuum bags, stored at 75° F. and 50% RH for 20-22 hours, and subjected to T-peel testing on an Instron at a peel rate of 2 in/min at 82° C. The average peel strength and max peel strength were obtained and tabulated in Table 1.

Examples E1-E8 and Comparative Examples CE1-CE8

As demonstrated herein, the adhesive systems in E1-E8 each contains about 12 wt % or more of the primary diamine in Part A and about 10 wt % or more of the primary and secondary diamines in the A+B adhesive system, and such adhesives exhibit much more improved peel strength compared to the adhesives in CE1-CE8.

TABLE 1

| Sample | Part B/ Part A | CB (wt %) | Primary Diamine (wt %) DMTDA | Secondary Diamine (wt %) DSB-PDA | Secondary Diamine (wt %) DSB-MDA | Polyol (wt %) Polyol-1 | Polyol (wt %) Polyol-2 | Polyol (wt %) Polyol-3 | Total Diamines$^b$ (wt %) | Total CB$^c$ (wt %) | Ave Peel Strength (ppli) | Max Peel Strength (ppli) |
|---|---|---|---|---|---|---|---|---|---|---|---|---|
| E1 | 2.22 | 7 | 14 | 22 | — | 48 | 8.2 | — | 11.2 | 9.3 | 77 | 95 |
| E2 | 2 | 9 | 12.6 | 19 | — | 51 | 8.4 | — | 20.53 | 9.7 | 62 | 70 |
| E3 | 2 | 9 | 13.1 | 20 | — | 50 | 7.9 | — | 11.03 | 9.7 | 84 | 98 |
| E4 | 2 | 9 | 12.6 | 19 | — | 43 | 8 | 8.4 | 10.53 | 9.7 | 61 | 70 |
| E5 | 2 | 9 | 12 | 27 | — | 44 | 8 | — | 13 | 9.7 | 77 | 88 |
| E6 | 1.54 | 7.7 | 13.8 | — | 23.1 | 47.3 | 8.1 | — | 12.3 | 9.1 | 48 | 58 |
| E7 | 2.02 | 9 | 12 | 27 | — | 44 | 8 | — | 12.91 | 10.1 | 68 | 78 |
| E8$^a$ | 1.86 | 9 | 12 | 27 | — | 44 | 8 | — | 13.66 | 5.1 | 45 | 57 |
| CE1 | 2 | 9 | 12.6 | 12 | — | 58 | 8.4 | — | 8.2 | 9.7 | 44 | 50 |
| CE2 | 2 | 9 | 8.6 | 19 | — | 55 | 8.4 | — | 9 | 9.7 | 43 | 51 |
| CE3 | 2 | 9 | 14 | — | — | 63 | 14 | — | 4.67 | 9.7 | 39 | 45 |
| CE4 | 2 | 9 | — | 22 | — | 61 | 8 | — | 7.33 | 9.7 | 15 | 19 |
| CE5 | 2 | 9 | 31.6 | — | — | 51 | 8.4 | — | 10.53 | 9.7 | 35 | 51 |
| CE6 | 2 | 9 | — | 31.6 | — | 51 | 8.4 | — | 10.5 | 9.7 | 29 | 34 |
| CE7 | 2 | 9 | 20 | 19 | — | 44 | 8 | — | 13 | 9.7 | 29 | 35 |
| CE8 | 2 | 9 | 6 | 33 | — | 44 | 8 | — | 13 | 9.7 | 36 | 42 |

Note:
$^a$In E8, Part B contains 3 wt % of CB;
$^b$total diamines based on the combined weight of Part A and Part B;
$^c$total CB based on the combined weight of Part A and Part B.

What is claimed is:

1. A two-component polyurethane adhesive system comprising Part A and Part B, wherein,
   Part A comprises (i) at least a first polyol, (ii) a primary diamine, and (iii) a secondary diamine; and
   Part B comprises a prepolymer that is a reaction product of at least one polyisocyanate and at least a second polyol,
   and wherein the content level of the primary diamine is about 7-19 wt %, based on the total weight of Part A;
   the combined content level of the primary diamine and the secondary diamine is about 10-30 wt %, based on the total weight of the two-component polyurethane adhesive system.

2. The two-component polyurethane adhesive system of claim 1, wherein, Part A and Part B are at a weight ratio of about 1:5-5:1.

3. The two-component polyurethane adhesive system of claim 1, wherein, Part A comprises about 15-23 wt % of the secondary diamine, based on the weight of Part A.

4. The two-component polyurethane adhesive system of claim 1, wherein, the primary diamine is aromatic diamine.

5. The two-component polyurethane adhesive system of claim 1, wherein, the primary diamine is selected from the group consisting of dimethylthiotoulenediamine (DMTDA), methylenedianiline, diethyltoluenediamine, phenylenediamine (1,4-diaminobenzene), 4,4'-diaminobiphenyl, diaminonaphthalene, and combinations of two or more thereof.

6. The two-component polyurethane adhesive system of claim 1, wherein the secondary diamine is aromatic diamine.

7. The two-component polyurethane adhesive system of claim 1, wherein, the secondary diamine is selected from the group consisting of N,N'-di-sec-butyl-p-phenylenediamine (DSB-PDA); 4,4'-methylenebis [N-sec-butylaniline] (DSB-MDA); primary aromatic diamines that have been N-alkylated; and combinations of two or more thereof.

8. The two-component polyurethane adhesive system of claim 1, wherein, the first polyol has a functionality of about 2-7 and an average equivalent weight of about 50-8000 g/mol.

9. An article comprising a first substrate, a second substrate, and a two-component polyurethane adhesive system of claim 1, wherein, the two-component polyurethane adhesive system is placed in-between the first and second substrates.

10. The article of claim 9, wherein, one or both of the first and second substrates are formed of cross-linked elastomers.

* * * * *